United States Patent Office 3,841,998
Patented Oct. 15, 1974

3,841,998
AEROBIC WASTEWATER TREATMENT PROCESS WITH PARTIAL REUSE AND INFREQUENT DOSING TO SOIL
Robert Paul Farrell, Jr., Schenectady, N.Y., assignor to Environment/One Corporation, Latham, N.Y.
Original application Mar. 11, 1970, Ser. No. 18,682, now abandoned. Divided and this application Dec. 7, 1972, Ser. No. 312,984
Int. Cl. C02c 1/00
U.S. Cl. 210—16
11 Claims

ABSTRACT OF THE DISCLOSURE

A waste disposal system, particularly for dwellings having limited drain fields or drain field soils having limited capacity and wherein the effluent is removed from an aerobic treatment and settling tank for ultimate return (at least in part) as flushing fluid for toilets, etc. The sludge is removed from the treatment and settling tank thereafter for further treatment and settling so that liquid may be removed from the sludge for return ultimately to the treatment and settling tank. The effluent used for flushing purposes is run into a storage tank, and thereafter may be chemically treated by a treatment solution eductor and stored in the surge tank supplying the toilets until it is used by the toilets in flushing. Waste water from toilets and other sources is deposited in a small holding tank until a predetermined level has been reached, at which time a grinder-pump will remove the waste from the holding tank and discharge it into the aerobic treatment and settling tank. The liquid removed from the sludge is returned to this holding tank. Various pressure and level sensing controls are used in conjunction with a coordinating and timing control unit to control the sequence of operations for efficiency. Excess effluent is discharged to a drain field or the like, in infrequent slug doses in a known manner to thereby enhance performance of any drain field of a given capacity.

---

This is a division of application Ser. No. 18,682, filed Mar. 11, 1970, now abandoned.

BACKGROUND TO THE INVENTION

Numerous systems have been proposed for treating waste from dwelling units which might include, but are not necessarily limited to individual homes, apartment buildings, motels, subdivisions, commercial and light industrial buildings, recreational areas, marinas, highway service areas and rest stops and the like. From this listing it will be appreciated that many of these classes of occupancy are remote from public utilities such as water supplies and sewers. Consequently, they normally rely on septic tanks and drain fields which generally have limited capacity due to the size of the drain field or the nature of the drain soil. To overcome the limited capacity problem, recycling of effluent for flushing purposes is known; however, there is a considerable need to upgrade the quality of the recycled effluent. Further, many prior systems have required constant running resulting in power inefficiency and at times unwanted suspension of particles.

In general, the prior art systems have been either too complex or expensive for employment with individual dwelling units or they have not been sufficiently efficient to satisfy the environmental and/or aesthetic demands of usage.

SUMMARY OF THE INVENTION

It is an object of the present invention to provide an efficient waste disposal system that will retain a minimum amount of sludge, discharge a high quality effluent to drain fields or the like in infrequent doses, recycle a high quality effluent for flushing purposes, and operate trouble-free without undue complexity, power loss and initial cost.

The waste is first deposited in a small holding tank where it accumulates to a predetermined quantity, at which time a grinder-pump unit is actuated to macerate and transfer the waste to a treatment tank. Thus, the grinder-pump unit operates only infrequently for efficiency; however its operation is predictable to the extent that other operations requiring periods of quiescence can be conducted without interference.

The aerobic treatment and settling tank has means that periodically pumps air through the waste material therein to enhance the aerobic action of the microorganisms present for decomposing the waste material, and to flocculate the waste material. Alternatively, or in addition, an agitator may be employed if necessary. When a predetermined quantity of waste material is present within the treatment and settling tank, the automatic controls will be actuated to first feed and mix a flocculating chemical and then provide a quiescent period wherein waste will not be discharged from the holding tank, air will not enter the treatment and settling tank and the agitator, if present, will be inoperative.

After this quiecent period, most of the effluent will be pumped out of the treatment and settling tank into an effluent storage tank. Thereafter, a measurement will be made of the remaining sludge and if of a predetermined quantity, the sludge will be removed to a sludge treatment tank.

After the removed sludge is treated by microorganisms and/or merely further separated by quiescence, the supernatant from the sludge treatment tank will be pumped into the holding tank. In this manner, a minimum amount of sludge will be retained.

In the effluent storage tank there is a partition dividing the tank into receiving side and discharge side. The effluent will pass from the receiving side to the discharge side, where its level will be controlled by an overflow or other level controlling device so that the excess effluent will pass to a suitable drain or drain field in infrequent slug doses in a known manner. The infrequent dosing relieves the loading on the drain field and permits improvided drying intermediate each slug dose to thereby enhance the performance of the drain field.

The flushing water for the toilets within the system will be obtained on demand from an air and water containing surge tank where high quality treated effluent is stored under pressure. According to the known manner of operating surge tanks, when the pressure within the surge tank falls below a predetermined level, a pump will be actuated to pump additional effluent from the effluent storage tank into the surge tank. The thus pumped additional effluent will pass through a check valve and preferably a chemical eductor before reaching the surge tank. Chemicals may be added to the effluent by the eductor for regulating its odor, color and microrganism content, or alternatively, the chemicals may be added at the effluent storage tank.

Suitable controls are provided for the automatic and maintenance-free operation of the system. The system is controlled so that a relatively short period of quiescence following introduction of the flocculant, is not interrupted by the intake of additional waste, admission of air, or operation of the agitator, for example, which might otherwise disturb the settling process aided by the flocculant.

BRIEF DESCRIPTION OF THE DRAWING

Further objects, features and advantages of the present invention will become more clear from the following detailed description of the drawings, wherein.

DETAILED DESCRIPTION OF THE DRAWING

The present invention is intended for use with (but is not necessarily limited to) individual houses, apartment buildings, motels, subdivisions, commercial buildings, light industrial buildings, recreational areas, marinas, highway service areas, bus highway service areas, bus stops and the like. As may be appreciated, many of these classes of occupancy or usage are remote from public utilities such as water supplies and sewers.

One of the primary objects of the present invention is to use the existing underground absorption capability of soils in a manner which will increase their contribution as adjuncts to a total sewage disposal system by approximately 400% or more. This improved soil performance can be put to extremely practical use in any one of the following manners:

(1) With the present system, it may be practical to use soils for absorption that would otherwise be unsuitable.
(2) The present system may require a soil absorption area that is considerably smaller than would otherwise be required with conventional systems, which will substantially reduce drain field installation cost and remove many limitations as to adjacent soil usage.
(3) The present invention will increase the life expectancy of a soil absorption system by "wetting " the soil at a much reduced rate.

Further, the present system produces a very high quality effluent that will be aesthetically and practically acceptable for many purposes either before or after an inexpensive and relatively simple chemical polishing step. Thus, the system will produce a liquid suitable for use as a flushing liquid in water closets of the building served, or alternatively, the liquid could be used for irrigation purposes.

Since the water recirculated for flushing purposes and the like would typically constitute somewhere between 30% and 80% of the total water usage, there will be a corresponding savings realized in true water consumption from a potable water supply and a corresponding reduction in the volume of effluent applied to the soil absorption system.

Further, since a portion of the liquid will be recirculated and the recirculating water will constantly be supplemented by fresh relatively clean waste water from tubs, sinks, showers and the like there will be no serious accumulation of hazardous, offensive, or unhealthy constituents in the flushing liquid. Such latter problems have been experienced to an unacceptable degree in earlier recirculating toilets and the like which had no provision for this significant and continual fresh make-up water feed.

Two preferred embodiments of the present invention are schematically shown in the attached drawing. Specific details are shown for purposes of illustration, without any intent to be solely limited thereto.

Figure 1:
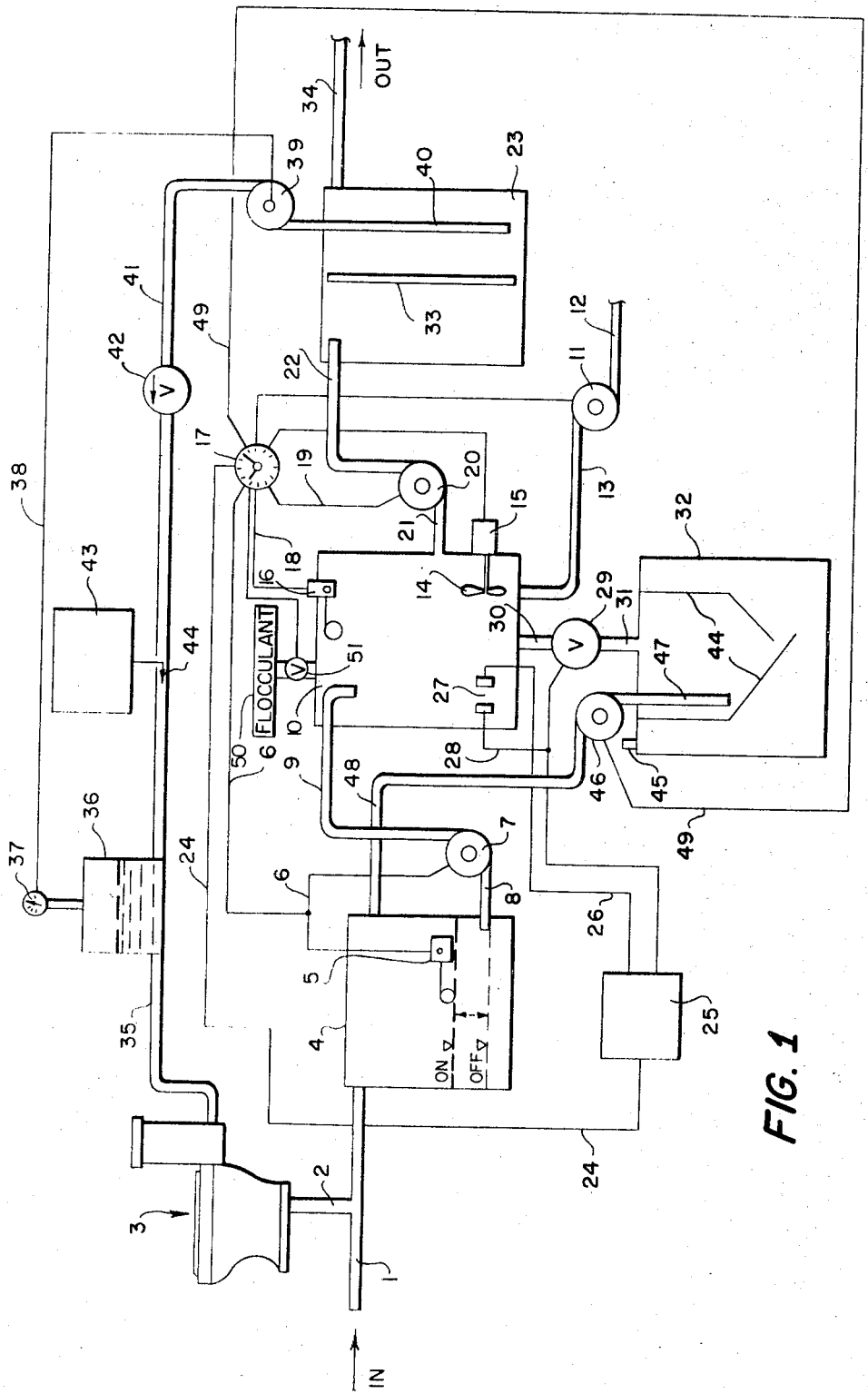
FIG. 1 is a schematic representation of the waste disposal system of the present invention showing the various tanks and other components in circuit with the fluid and electrical control circuits.

In the embodiment of FIG. 1, normal building waste water enters through waste fluid pipe 1 and combines with the side stream waste fluid pipe 2 for discharging the combined waste fluid into a holding tank 4. The waste fluid within the side stream pipe 2 will be obtained from conventional toilets 3 and urinals (not shown), while the waste fluid in pipe 1 is received from all other sources (not shown) within the building, for example, sinks, showers and the like.

Thus, the waste fluid enters the holding tank 4 as generated in small batches and intermittent flows depending upon the activity patterns within the building. After the holding tank 4 has received a relatively small volume, for example 50 gallons of waste fluid, the float operated switch 5 will send a signal through line 6 to actuate a motor driven grinder-pump combination 7 for withdrawing the waste fluid from outlet pipe 8 at the bottom of tank 4, mascerating and mixing the relatively solid and relatively liquid portions of the waste fluid in the grinder, and pumping the thus mixed fluid through discharge pipe 9 into a microorganism treatment and settling tank 10.

The details of the grinder-pump unit 7 form no part of the present invention, but for purposes of further illustration the unit may be considered as employing an upstream lower comminuting device and a downstream upper helical gear pump such as that shown in United States patent 2,612,845, to Byran et al. of Oct. 7, 1952. A conventional electric motor would drive both the pump and grinder with a single common shaft.

To prevent odors, the holding tank 4 would be vented to the atmosphere through the building drainage system of which pipes 1 and 2 are a part. Other conventional types of level sensing devices may be employed instead of the per se conventional float operated switch 5. The switch 5 or another similar switch will stop the grinder-pump when a lower predetermined level is sensed.

The treatment and settling tank 10 is initially seeded with microorganisms for treatment of the waste fluid, particularly for aerobic treatment. With aerobic treatment, a suitable pump, for example a centrifugal blower 11, is periodically or intermittently actuated to pump an oxygen containing fluid such as air from an oxygen fluid source 12 through pipe 13 for discharge adjacent the bottom of the treatment tank 10 to bubble upwardly through the waste fluid within the tank 10, in a known manner. This aeration is sufficient to maintain aerobic conditions conducive to a high degree of stabilization of the organic content of the waste water within the tank 10. With the initial seeding, the tank 10 will contain a controlled amount of activated sludge, for both adsorption and biological stabilization. The upper passage of the air from conduit 13 through the waste water will produce a thorough continuous mixing of the waste water within the treatment tank 10, which is desirable during microorganism treatment; however, if further mixing is desired, a suitable agitator 14, such as an impeller, may be driven by an electric motor 15.

The aerobic treatment and mixing within the treatment and settling tank 10 will continue as long as required to fill the tank 10 to its operating level near the top, as determined by the level sensing device float operated switch 16. On the average, the treatment and settling tank 10 will fill once in 24 hours. When the treatment and settling tank 10 does become full as determined by the level sensor 16, a signal is sent to a central cycling and control mechanism 17 through electric line 18 to begin a cycle of flocculation, sedimentation, effluent draw-off, sludge level determination and removal of excess sludge (if any), in the order named. This entire cycle of operation will be initiated first by the introduction of a suitable flocculating chemical from a source 50 into the treatment and settling tanks 10. The flocculating chemical preferably comprises a synthetic, water soluble, high molecular weight, cationic organic polymer such as Dow "Purifloc"-C-31 manufactured and sold by the Dow Chemical Company; Rohm and Haas "Primafloc" C-3 manufactured and sold by the Rohm and Haas Company or Dearbon or "Aquafloc" manufactured and sold by the Dearborn Chemical Company.

When the level sensing device 16 senses the attainment of the predetermined level within the treatment and settling tank 10, a signal is developed by the level sensor 16 and supplied through electrical line 18 to the control device 17 where it initiates operation of the central control mechanism. It will be appreciated that after the preceeding opertaion of the grinder-pump unit, the level of waste fluid within the treatment and settling tank 10 will be at some point below the level required to initiate operation of the central controller 17 by level sensor 16. At some point during the next successive operation of the grinder-pump 9 (and last operation prior to cycling the system through a cycle of flocculation, sedimentation; draw-off, etc.), the required level in tank 10 will be attained. This may occur early in the last operation of the grinder-pump or later. To accommodate such variations, provision is made to allow the grinder-pump 7 to complete its pump down of holding tank 4. This is accomplished by including in the central control mechanism 17 an appropriate delay for inhibiting initiation of the introduction of flocculant from source 50 into treatment and settling tank 10, until such time that the grinder-pump 7 completes its last operation. Alternatively, the grinder-pump 7 could be inhibited from further operation once the level sensor 16 has been triggered, or the further pump-grinding operation could be conducted concurrently with introduction of the flocculant from source 50 and subsequent mixing for a period of time to accommodate complete pump-out of the holding tank 4. It is preferred, however, to inhibit start of the flocculation, sedimentation, etc. cycle since this will allow the holding tank 4 to be completely emptied prior to the start of such cycle. In this manner, tank 4 will be conditioned to receive all new waste discharge during the cycle. To assure that grinder-pump unit 7 does not operate to discharge new waste fluid into treatment and settling tank 10 during the flocculation, etc. cycle, the central control 17 operates to positively inhibit the grinder-pump unit during this period despite the condition of the level sensor (float operated switch 5). This inhibit condition is maintained during the complete flocculation, sedimentation, effluent draw-off, etc. cycle to be described hereinafter, and then is removed to return the grinder-pump unit to its normal condition under the control of the float operated switch 5. Thus, the control mechanism 17 through its inhibiting action, and the emptying of the holding tank 4 at the beginning of the cycling, prevents discharge of new waste material from the holding tank 4 into the tank 10 for a period of time sufficient to complete the cycling within the tank 10.

Upon completion of the last operation of grinder-pump 7 after triggering the float operated switch 16, the central control mechanism will actuate a control valve 51 for admitting a measured quantity of flocculant from source 50 into tank 10. This measured quantity will be in proportion to the size of the tank 10. Thereafter the aerator 11 will continue to bubble air up through the tank 10 for a period to assure thorough mixing of the flocculant. This mixing period may last for two or three minutes, or the like dependent upon the size of tank 10, manner of introduction of the flocculant, etc. If desired, the agitator 14 could be operated during the mixing period, or alternatively, could be employed in place of the air mixing. However, air mixing is preferred because of simplicity, ease of maintenance, etc.

After thorough mixing of the flocculant into the waste material, the control mechanism 17 prevents further actuation of the air supply 11, 12 (and electric motor 15 if used) to provide a predetermined quiescent period for sedimentation to form a sludge layer at the bottom of tank 10 and a high quality effluent at the top of tank 10. After this quiescent period the control mechanism 17 will initiate a supernatant draw-off period by sending a signal through electric line 19 for actuating the pump 20 to remove the high quality effluent from the tank 10 through outlet pipe 21 for discharge by pipe 22 into an effluent storage tank 23. The outlet pipe 21 is preferably placed at an appropriate level with respect to the tank 10 and the pump 20 actuated for a sufficient time so that liquid is drawn off from the level of actuating the level sensor 16 down to the level of the outlet pipe 21, or an additional level sensor (not shown) may be provided below the level sensor 16 for deactuating the pump 20 at an appropriate level.

Thereafter, the control mechanism 17 sends a signal through electric line 24 to a sludge control mechanism 25. Upon actuation, the sludge control mechanism 25 will first send a signal through line 26 to operate the sludge level sensor 27, which may be a photocell unit, to determine if the sludge extends above a predetermined level. Only if the sludge extends above a predetermined level, the sensor 27 will send a signal through line 28 for coordination with a signal from control mechanism 25 to operate a flow control device 29, which merely may be a valve or a pump, to withdraw sludge through tank outlet 30 in the bottom of tank 10 for passing the sludge through discharge pipe 31 into a sludge settling or digestor tank 32. Flow control device 29 will operate only for a sufficient time to remove the excess sludge, which may be controlled directly by the sensor 27 in that when a sufficient amount of sludge has been removed to lower the level of the sludge below the sensor 27, the flow control device 29 will be deactuated to prevent flow from pipe 30 to pipe 31. In this manner, an optimum amount of activated sludge is maintained in tank 10, but sufficient to activate or aerobically treat later incoming new waste water.

Thereafter, the control mechanism 17 will return the system to the previously described operation wherein waste water from holding tank 4 is periodically, as controlled by level sensor 5, discharged into tank 10 and air from source 12 and blower 11 is bubbled continuously through the new incoming waste water and retained activated sludge to thoroughly mix the two and aerobically treat the new waste water. This condition is maintained until level sensor 16 again actuates the control mechanism 17 to run through the previously described cycling.

As described above, a batch of high quality effluent is cycled and transferred from the treatment and settling tank 10 by means of pump 20 into the effluent storage tank 23 in one continuous cycling and transfer operation approximately once in every 24 hours. Preferably, this cycling and transfer operation takes place in a relatively short period of time, for example, 30 minutes or less. At the beginning of the effluent or supernatant draw-off phase of the effluent storage tank 23 will be only partially full, it previously having served as a source of flushing water for the various toilets and urinals within the building, or as a source of irrigation water or the like, during the preceding approximately 24 hours during which the treatment and settling tank 10 was being filled.

Preferably, the effluent storage tank 23 is provided with an intermediate partition 33 that extends upwardly above the maximum effluent level, but below the top of the tank to provide cross ventilation but not cross fluid flow from one side to the other, and downwardly closely adjacent, but not to the bottom of the tank to provide cross fluid flow. Thus, the high quality effluent is discharged from pipe 22 to one side of the partition 33 and discharged from the opposite side, thereby preventing short circuiting the flow. If desired, additional partitions can be provided. Preferably, the maximum level within the effluent storage tank 23 is determined by the overflow pipe 34, which leads to a drain field or the like.

As a consequence of the above arrangement, the soil absorption system such as a tile drain field or the like, will receive one slug of high quality (secondary or better) effluent at intervals dependent upon the usage pattern in the building or buildings served, but approximately once daily. This procedure has been shown by the research of Bendixen and Popkin (Ronald A. Popkin and Thomas W. Bendixen, "Feasibility of Improved Subsurface Disposal," Journal of the Sanitary Engineering Division, April 1968, and Ronald A. Popkin and Thomas W. Bendixen, "Improved Subsurface Disposal," Journal Water Pollution Control Federation, Part I, August 1968), to greatly improve the capability of typical simulated soils to perform as soil absorption systems. In some cases, the observed improvement was so great as to suggest that only 17% as much soil absorption area need be provided as would be required by current standard practice.

Partial recycling is accomplished in the following manner. The urinals or toilets 3 are provided with conventional mechanisms to control the flushing water, which is received solely from flushing water pipe 35. Alternatively, a certain proportion of fresh water make-up may be introduced into the system by adding the water to the urinals or toilet 3, at this point. Flushing water for pipe 35 is obtained on demand from a surge or holding tank 36, which tank is conventional per se. This flushing water is maintained within the surge tank 36. A pressure controlled switch or other pressure control means 37 actuates, through electric line 38, a liquid pump 39 to pump water through pipes 40 and 41 from the effluent discharge side of the partition 33 within the effluent storage tank 23 to the surge tank 36. To prevent backflow of liquid from the surge tank 36 and the resulting pressure loss, a check valve 42 is provided in the fluid circuit between the effluent storage tank 23 and the surge tank 36, preferably immediately downstream from the pump 39.

Although the quality of the liquid removed from the effluent storage tank 23 by the pump 39 is high enough to be entirely safe and functional as flushing water without further treatment, further treatment may be provided if desired as follows. To ensure that the flushing water is aesthetically acceptable, it may be polished by adding one or more treatment chemicals which can include a coloring agent, odorant, disinfectant and anti-foaming agent. One or more of these chemicals, which are known per se and will not be described in detail, may be added into the flushing water by means of an eductor, for example, on demand. The chemicals are maintained within storage tank 43 where they are withdrawn on demand by means of a conventional jet pump type eductor 44 or other conventional dosing device that is responsive to the flow of liquid, particularly the velocity, within the pipe 41. Instead of the pressure switch 37, a device may be used to detect flow within the pipe 35 to automatically actuate the pump 39 for a period, which will pump liquid into the surge tank 36 at the rated pressure of the pump. Also, should it appear that substantially all of the effluent stored in the storage tank 23 is being recycled or otherwise used, suitable treatment chemicals, polishing agents, etc. can be inserted at the effluent storage tank.

Sludge removed from the treatment settling tank 10 is further treated and separated for removal of the liquid phase therefrom to again pass through the treatment system. Sludge through pipes 30 and 31 as determined by the flow control device 29 is received within the sludge tank 32 for further digesting treatment or the like. The tank 32 may be of the known Imhoff design, which is provided with baffles 44 to obtain separate zones for sedimentation and anerobic sludge digestion. A vent 45 is provided on the tank 32 for connection with the atmosphere or another portion of the system containing only gas. Alternatively, it is contemplated that air may be delivered to the tank 32 continuously or not from a separate source or pump 11 for aerobic sludge digestion, as a variation of the FIG. 1 apparatus.

Means are provided for removing the supernatant liquid from the sludge settling tank 32 and returning it to the holding tank 4, although a non-preferred form could return the effluent from the sludge tank 32 directly to the treatment and settling tank 10. Such means may take the form of a level sensor to operate a suitable pump, but preferably a pump 46 is actuated to withdraw supernatant from the tank 32 down to a predetermined level as determined by the downward extent of its inlet pipe 47 into the tank 32. The pump 46 discharges the effluent from the sludge tank 32 through its discharge pipe 48 into the holding tank 4. Preferably, the control mechanism 17 will periodically operate the pump 46 through electric line 49 without any level sensors for tank 32, for example in coordination with control device 29, and so that the pump 46 will not operate during the cycling within treatment and settling tank 10, which might otherwise cause an overflow from the holding tank 4 into the tank 10. The control mechanism 17 will not operate the pump 46 during the period immediately after the tank 32 receives sludge from the tank 10 to avoid agitation which might result in the pump 46 sucking sludge out of the tank 32. With the control mechanism 17 delaying actuation of the pump 46 until a sufficient settling time after sludge is added to the tank 32, the inlet pipe 47 may be adjacent the discharge pipe 31, but if actuation or operation of the pump 46 is at the same time or close to discharge of sludge into the tank 32 as determined by control mechanism 17, it would be desirable to have the inlet pipe 47 on the opposite side of a baffle 44 from the discharge pipe 31 (which alternate construction is not shown in the drawing).

The sludge tank 32 could be below the treatment and settling tank 10 as shown so that only a valve 29 would be required along with the pump 46; alternately, according to FIG. 2, the sludge tank 32 could be at the same height as the tank 10 requiring a pump at 29 or as a variation of the FIG. 2 device, sludge tank 32 could be above the holding tank 4 in which case the pump 46 could be replaced by a suitable valve or simple overflow pipe. Also, the control system could contain additional sensors intended to detect any significant departure from normal conditions in the system, such as overfilling of holding tank 4 during cycling, and give a warning before serious consequences develop.

Figure 2:
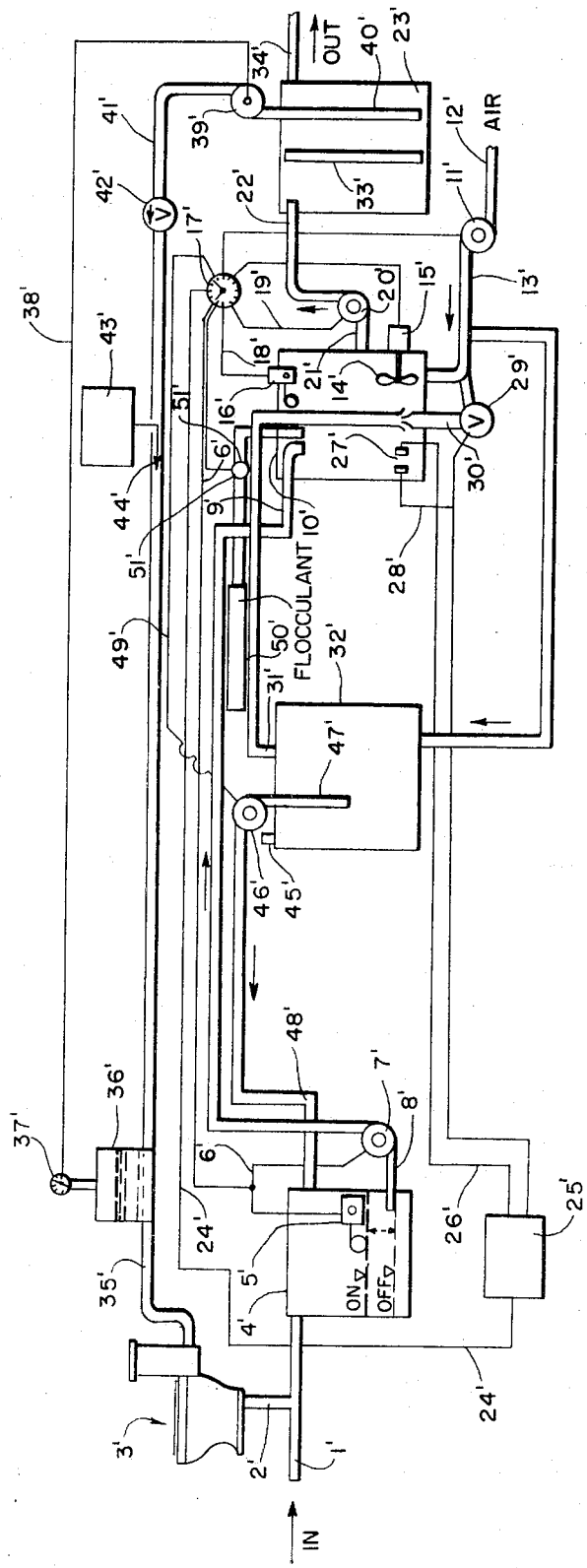
FIG. 2 is similar to FIG. 1, but of another embodiment of the present invention.

In the embodiment of FIG. 2, the elements have been provided with numerals corresponding to the numerals of identical or similar elements of FIG. 1, with primes being added to show that FIG. 2 is a modification. With respect to FIG. 2, only those elements that have been added, changed or re-located, as compared to FIG. 1, will be discussed below; however, to avoid duplication of disclosure, it is expressly understood that the disclosure with respect to FIG. 1 is incorporated herein in its entirety for FIG. 2, where applicable.

In FIG. 2, the sludge settling tank 32', is located at the same level with the tanks 4' and 10'. The valve 29' controls the removal of sludge from the tank 10' with the same controls and sequence of operation as the valve 29 of FIG. 1. However, the valve 29', when opened, will allow compressed air from pump 11' to pass from the terminal end nozzle of pipe 30' upwardly into the inverted, funnel-shaped inlet of pipe 31' to thus pump sludge and carry liquid from tank 10' through the pipe 31' into the sludge tank 32'. This schematically illustrated pump is generally known as a Pohle airlift pump and is more fully disclosed in FIG. 2 on page 3 of the Encyclopedia Americana, copyright 1953, by the Americana Corporation, under the heading "Pumps, Compressed-Air." Although other types of pumps may be used for this purpose, this type of airlift pump is preferred due to its simplicity, and available source of compressed air and resulting simplicity of controls. As illustrated, the airlift pump would be operating only with a correlation of the previously described controls for valve 29' and when the pump 11' is in operation. Alternatively, the pump 11' may operate continuously to provide a permanent source of compressed air in combination with an additional valve in parallel with valve 29' under the control of the illustrated electric line that now connects between 11' and 17' so that the resulting cycling of aeration for tank 10' remains the same and the airlift may operate independently.

In each embodiment of FIGS. 1 and 2, the tanks 32, 32' may have interior baffles or not and may be cylindrical, box-shaped, or any other shape. A tank 32' without baffles has been illustrated for FIG. 2. Similarly, each of the tanks 32, 32' may be either aerobic or anaerobic; an aerobic tank 32' has been illustrated for FIG. 2, with an air pipe connection leading from the output of the pump 11' to the botom of tank 32' for bubbling air through the sludge within tank 32' to assist in aerobic digestion of the sludge, which may be continuous or intermittent.

It is thus seen that although there are specific advantages to the specifically described details of the several embodiments and variations of the present invention, many further modifications, variations and embodiments are contemplated within the broader aspects as determined by the appended claims.

What is claimed is:

1. A method for treating waste material received from a dwelling unit having a recycled water supply in a plurality of treatment and storage tanks comprising the following steps in order: collecting fluid waste to be treated over an interval of time in a holding tank; transferring the fluid waste to a treatment tank; aerobically treating the quantity of waste material collected in the treatment tank and aerating said quantity of waste material for a period of time to enhance the aerobic treatment; admitting a flocculating substance into the treatment tank and mixing the flocculating substance into the aerobically treated waste material; providing a sufficient quiescent period of time following admission and mixing of the flocculating substance for settling and separating of said waste material with an effluent to the top and sludge to the bottom of the treatment tank; drawing off a substantial quantity of effluent from the upper portion of the treatment tank and passing said effluent to an effluent storage tank where a portion of said effluent is supplied to said recycled water supply and another portion is supplied to a drainage system in infrequent doses; removing a portion of the sludge in excess of a predetermined quantity from the lower portion of the treatment tank and passing the removed sludge to a digester; treating the sludge in the digester and providing a settling quiescent period for the removed sludge and any carried liquid to separate the carried liquid from sludge; and thereafter returning the separated carried liquid back to said holding tank for repeated aerobic treatment in said treatment tank.

2. The method of claim 1 wherein the steps of flocculation, settling and effluent draw-off are initiated only in response to the presence of a predetermined quantity of waste fluid collected in the treatment tank.

3. The method of claim 1 wherein the draw-off effluent stored in the effluent storage tank is further treated with suitable polishing agents.

4. The method of claim 3, wherein only that effluent in excess of a predetermined quantity is discharged to a drain field for disposal in infrequent slug doses.

5. The method of claim 1 wherein the excess sludge provided to the digester is subjected to an anaerobic sludge digestion treatment.

6. The method of claim 2 wherein the excess sludge provided to the digester is subjected to an aerobic sludge digestion treatment.

7. The method of claim 1 further including sewage macerating unit wherein waste material with entrained solids to be treated is first collected from the dwelling unit in said holding tank and then macerated and delivered as liquid slurry with the entrained macerated solids to the treatment tank.

8. The method of claim 7 wherein the drawn-off effluent stored in the effluent storage tank is further treated with suitable polishing agents.

9. The method of claim 8 wherein the steps of flocculation, settling and effluent draw-off are initiated only in response to the presence of a predetermined quantity of waste fluid collected in the treatment tank and effluent in excess of a predetermined quantity in the effluent storage tank is discharged to a drain field for disposal in infrequent slug doses.

10. The method of claim 9 wherein the excess sludge provided to the digester is subjected to an anaerobic sludge digestion treatment.

11. The method of claim 9 wherein the excess sludge provided to the digester is subjected to an aerobic sludge digestion treatment.

References Cited

UNITED STATES PATENTS

| | | | |
|---|---|---|---|
| 3,135,686 | 6/1964 | Campbell et al. | 210—7 |
| 3,713,543 | 1/1973 | Heaney | 210—8 |
| 2,772,234 | 11/1956 | Kelly | 210—16 |
| 2,798,227 | 7/1957 | Boester | 210—4 |
| 3,327,855 | 6/1967 | Watson et al. | 210—152 X |
| 3,331,771 | 7/1967 | Watson et al. | 210—15 X |
| 3,543,294 | 11/1970 | Boester | 210—60 X |
| 3,537,583 | 11/1970 | Wahner et al. | 210—8 X |

FRANK A. SPEAR, JR., Primary Examiner

P. A. HRUSKOCI, Assistant Examiner

U.S. Cl. X.R.

210—16, 18